US010352721B2

(12) United States Patent
Eno et al.

(10) Patent No.: US 10,352,721 B2
(45) Date of Patent: Jul. 16, 2019

(54) DRIVER NOTIFICATION OF ROADWAY FEATURES ON A VEHICLE ROUTE

(71) Applicant: Verizon Patent and Licensing Inc., Basking Ridge, NJ (US)

(72) Inventors: Joshua D. Eno, Denver, CO (US); Rajat Agrawal, Denver, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 23 days.

(21) Appl. No.: 15/617,908

(22) Filed: Jun. 8, 2017

(65) Prior Publication Data

US 2018/0356248 A1      Dec. 13, 2018

(51) Int. Cl.
*G01C 21/36*    (2006.01)

(52) U.S. Cl.
CPC ..... *G01C 21/3697* (2013.01); *G01C 21/3679* (2013.01)

(58) Field of Classification Search
CPC .................................................. G01C 21/3697
See application file for complete search history.

(56) References Cited

U.S. PATENT DOCUMENTS

| 9,134,426 | B1* | 9/2015 | Siris | G01S 19/07 |
| 9,494,439 | B1* | 11/2016 | Ross | B60W 50/029 |
| 2008/0109163 | A1* | 5/2008 | Stone | G08G 5/0008 301/16 |
| 2010/0318291 | A1* | 12/2010 | Gluck | G01C 21/367 701/532 |
| 2014/0306833 | A1* | 10/2014 | Ricci | B60Q 1/00 340/901 |
| 2014/0309864 | A1* | 10/2014 | Ricci | H04W 4/21 701/36 |
| 2016/0334797 | A1* | 11/2016 | Ross | G08G 1/20 |
| 2017/0090480 | A1* | 3/2017 | Ho | G05D 1/0214 |
| 2017/0148241 | A1* | 5/2017 | Kerning | H04W 4/12 |
| 2017/0371608 | A1* | 12/2017 | Wasserman | G06F 3/14 |
| 2018/0268359 | A1* | 9/2018 | Soubhagya | G06Q 10/08 |

* cited by examiner

*Primary Examiner* — Alex C Dunn

(57) ABSTRACT

A device can determine route information associated with a route of a vehicle. The device can identify, based on the route information, feature data associated with the route of the vehicle. The device can determine, based on the feature data, notification information associated with a feature on the route of the vehicle. The feature can include at least one of: a passing zone on the route of the vehicle, a school zone on the route of the vehicle, a potential roadway hazard on the route of the vehicle, a segment of the route with a speed limit that is different from a speed limit of another segment of the route, or a segment of the route with a number of lanes that is different from a speed limit of another segment of the route. The device can provide the notification information associated with the feature.

20 Claims, 9 Drawing Sheets

DRIVER NOTIFICATION OF ROADWAY FEATURES ON A VEHICLE ROUTE

BACKGROUND

A mapping service can provide (e.g., to a user via a user device) information associated with one or more mapping-related services. Such information can include, for example, driving directions associated with two or more locations, information that identifies a point of interest (e.g., as indicated or searched by the user), voice-guided navigational information, real-time traffic information, satellite imagery, street maps and/or views, route planning information, and/or the like.

DETAILED DESCRIPTION OF PREFERRED EMBODIMENTS

Figure 1:
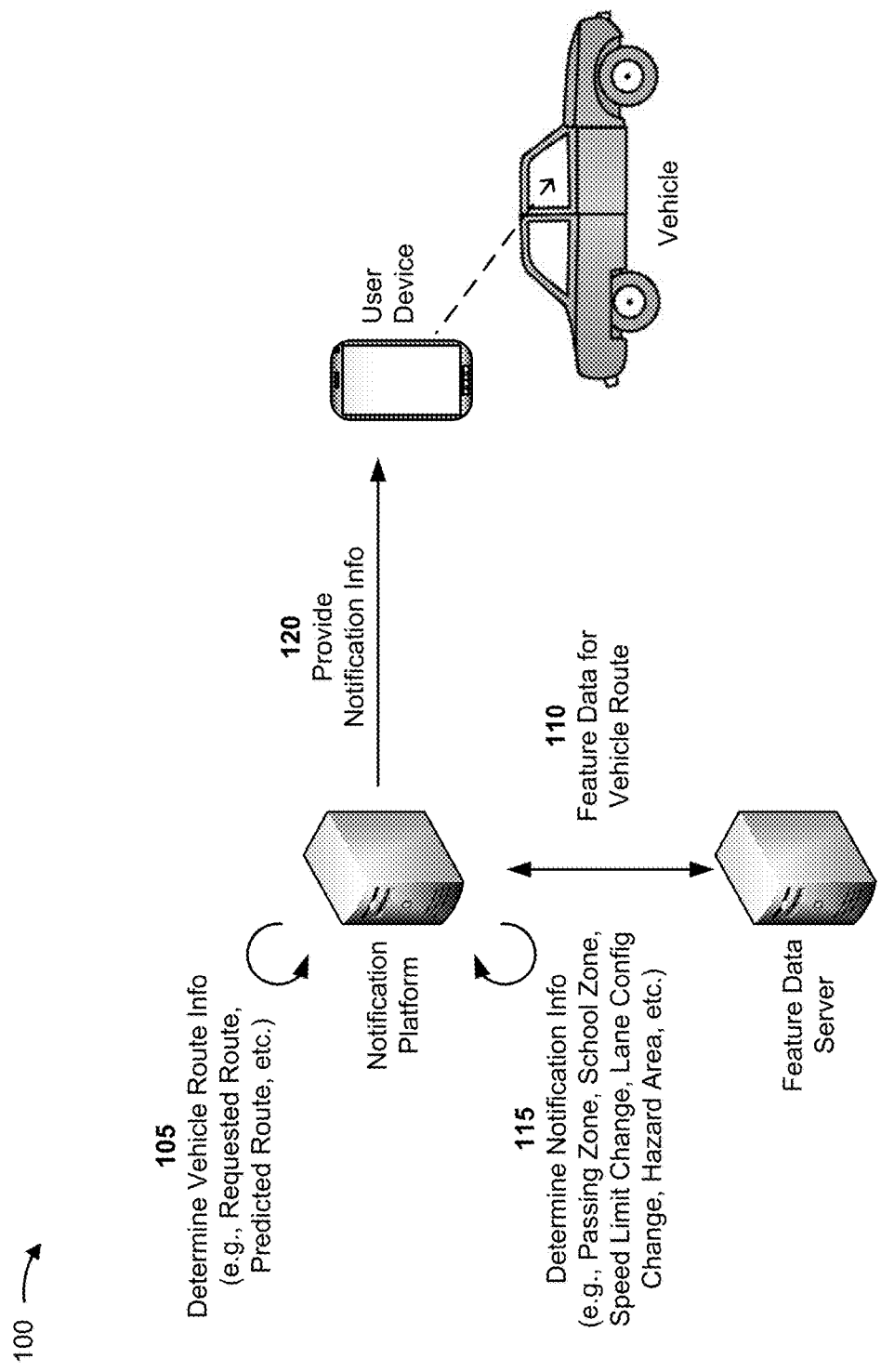
FIG. 1 is a diagram of an overview of an example implementation described herein.

The following detailed description of example implementations refers to the accompanying drawings. The same reference numbers in different drawings can identify the same or similar elements.

A conventional mapping service can be capable of determining a route for driving a vehicle between two or more locations (e.g., a shortest route by distance, a shortest route by time, a route that avoids tolls, and/or the like). In some cases, the mapping service can be capable of determining one or more other types of information associated with the route of the vehicle, such as (e.g., real-time or near real-time) information associated with traffic conditions along the route, information that identifies a speed limit on a portion of the route, and/or the like. Such information can be provided to a user device for display to a user (e.g., a driver of the vehicle).

However, the conventional mapping service cannot determine or provide information associated with one or more features of the route that can be of interest to the user while driving the vehicle on the route, such as information associated with a passing zone (e.g., a segment of roadway in which passing is permitted), information associated with a school zone, a roadway segment in which a speed limit is significantly higher or lower than a speed limit of a segment in which the vehicle is currently driving, a potential roadway hazard (e.g., a sharp curve, a rock slide area, a no stopping zone, and/or the like), a segment of the route in which a number of lanes is greater than or less than a number of lanes in a segment in which the vehicle is currently driving, and/or the like.

Some implementations described herein provide a notification platform that determines and provides (e.g., to a user device) notification information associated with a feature of a segment of a roadway on which a vehicle is or is expected to be driving. Examples of such features include a passing zone, a school zone, a roadway segment in which a speed limit is significantly higher or lower than a speed limit of a segment in which the vehicle is currently driving, a potential hazard area, a segment of the route in which a number of lanes is greater than or less than a number of lanes in a segment in which the vehicle is currently driving, and/or the like.

In some implementations, the notification platform can perform an action based on the notification information. For example, the notification platform can provide the notification information such that the information can be displayed to the user (e.g., a driver) before the vehicle reaches the segment of the roadway at which the feature is located. In some implementations, the notification can include information that identifies the feature and/or a type of the feature, a length of the feature, an estimated amount of time that the vehicle can be within or pass through the feature, and/or the like, as described in further detail below. As another example, the notification platform can provide the notification information for use in automatically controlling the vehicle (e.g., by an autonomous driving system of the vehicle), for example, by causing the vehicle to decrease speed, increase speed, pass another vehicle, change lanes, and/or the like. In some implementations, the notification platform 215 can perform another type of action based on the notification information, as described below.

FIG. 1 is a diagram of an overview of an example implementation 100 described herein. As shown in FIG. 1, assume that a user device can be located in a vehicle. As shown by reference number 105, a notification platform can determine route information associated with a route of the vehicle. The route information can include information associated with a route of a vehicle. For example, the route information can include information that identifies one or more roadways on which the vehicle is being driven or is expected to be driven, one or more segments of the one or more roadways (e.g., information that identifies one or more portions of the one or more roadways), and/or the like. In some implementations, the notification platform can determine the route information based on a planned route of the vehicle, a predicted route of the vehicle, or a current location and direction of the vehicle, as described below.

As shown by reference number 110, the notification platform can determine feature data associated with the route of the vehicle. The feature data can include information associated with one or more features of the route that can be of interest to the user while driving the vehicle on the route. For example, the feature data can include information associated with a passing zone, a school zone, a potential roadway hazard, a segment of the route in which a speed limit is significantly higher or lower than another segment of the route, a segment of the route in which a number of lanes is different from another segment of the route, and/or the like, as described below.

In some implementations, the notification platform can determine the feature data based on providing the route information to a feature data server (e.g., a server that stores feature data associated with a different roadways), along with a request for feature data corresponding to the route associated with the route information. Here, the feature data server can determine the feature data, associated with the route, based on the route information and the feature data stored by feature data server, and provide the feature data to the notification platform accordingly.

As shown by reference number 115, the notification platform can determine notification information associated with the route. The notification information can include information associated with a notification, related to the feature along the route, that is to be provided to the user device (e.g., for display to a user). For example, the notification information can include information that identifies a distance to the feature, a length of the feature, an amount of time before the vehicle reaches the feature, an estimated amount of time that the vehicle can be within or pass through the feature, information that describes the feature (e.g., a type of the feature, a speed limit associated with the feature, etc.), and/or the like.

In some implementations, the notification platform can determine the notification information based on the feature data associated with the route and information associated with the user device and/or the vehicle, such as a current location of the user device and/or the vehicle, a current or historical speed of the user device and/or the vehicle, and/or the like, as described in further detail below.

As shown by reference number 120, the notification platform can provide the notification information to the user device. The user device can receive the notification information, and provide the notification information for display to the user. Additionally, or alternatively, the user device can play an audible indication associated with the notification information.

In this way, a notification platform can determine and provide (e.g., to a user device) notification information associated with a feature of a segment of a roadway on which a vehicle is or is expected to be driving. In some implementations, the notification platform can provide the notification information to the user device before the vehicle enters or passes the feature (e.g., in order to allow a driver of the vehicle to prepare to navigate the feature).

As indicated above, FIG. 1 is provided merely as an example. Other examples are possible and can differ from what was described with regard to FIG. 1.

Figure 2:
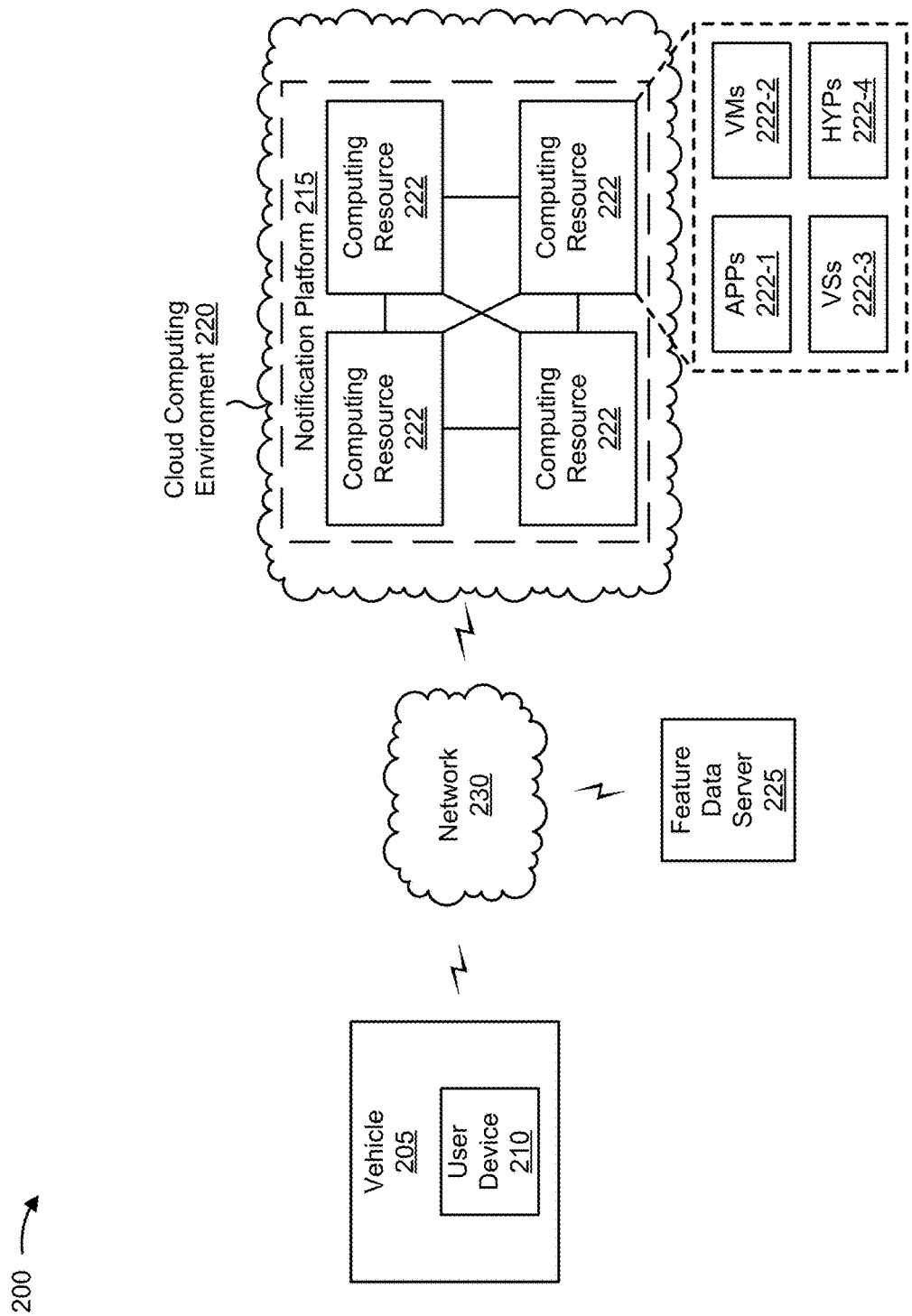
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include one a vehicle 205, a user device 210, a notification platform 215 (e.g., hosted in a cloud computing environment 220), a feature data server 225, and a network 230. Devices of environment 200 can interconnect via wired connections, wireless connections, or a combination of wired and wireless connections.

Vehicle 205 includes a vehicle, such as a car, a bus, a truck, or another type of roadway vehicle. In some implementations, vehicle 205 can travel on a route for which notification platform 215 can provide notification information associated with a roadway feature, as described herein. In some implementations, vehicle 205 can be an autonomous vehicle (e.g., a driverless vehicle) or a driver-controlled vehicle. In some implementations, vehicle 205 can be include user device 210 (e.g., user device 210 can be a device that is mounted in, attached to, or a part of vehicle 205).

User device 210 includes one or more devices capable of receiving, generating, storing, processing, and/or providing notification information associated with roadway feature. For example, user device 210 can include a communication and computing device, such as a mobile phone (e.g., a smart phone, a radiotelephone, etc.), a tablet computer, a handheld computer, a wearable communication device (e.g., a smart wristwatch, a pair of smart eyeglasses, etc.), a device integrated in vehicle 205 (e.g., a touch screen device included in vehicle 205), a navigation system of vehicle 205, or a similar type of device.

Notification platform 215 includes one or more devices capable of determining notification information associated with a roadway feature, and providing the notification information (e.g., to user device 210). For example, notification platform 215 can include a server or a group of servers. In some implementations, as shown, notification platform 215 can be hosted in cloud computing environment 220. Notably, while implementations described herein describe notification platform 215 as being hosted in cloud computing environment 220, in some implementations, notification platform 215 is not cloud-based or can be partially cloud-based.

Cloud computing environment 220 includes an environment that delivers computing as a service, whereby shared resources, services, etc. can be provided to user device 210. Cloud computing environment 220 can provide computation, software, data access, storage, and/or other services that do not require end-user knowledge of a physical location and configuration of a system and/or a device that delivers the services. As shown, cloud computing environment 220 can include a set of computing resources 222.

Computing resource 222 includes one or more personal computers, workstation computers, server devices, or another type of computation and/or communication device. In some implementations, computing resource 222 can host notification platform 215. The cloud resources can include compute instances executing in computing resource 222, storage devices provided in computing resource 222, data transfer devices provided by computing resource 222, etc. In some implementations, computing resource 222 can communicate with other computing resources 222 via wired connections, wireless connections, or a combination of wired and wireless connections.

As further shown in FIG. 2, computing resource 222 can include a group of cloud resources, such as one or more applications ("APPs") 222-1, one or more virtual machines ("VMs") 222-2, virtualized storage ("VSs") 222-3, one or more hypervisors ("HYPs") 222-4, or the like.

Application 222-1 includes one or more software applications that can be provided to or accessed by user device 210. Application 222-1 can eliminate a need to install and execute the software applications on user device 210. For example, application 222-1 can include software associated with notification platform 215 and/or any other software capable of being provided via cloud computing environment 220. In some implementations, one application 222-1 can send/receive information to/from one or more other applications 222-1, via virtual machine 222-2.

Virtual machine 222-2 includes a software implementation of a machine (e.g., a computer) that executes programs like a physical machine. Virtual machine 222-2 can be either a system virtual machine or a process virtual machine, depending upon use and degree of correspondence to any real machine by virtual machine 222-2. A system virtual machine can provide a complete system platform that supports execution of a complete operating system ("OS"). A process virtual machine can execute a single program, and can support a single process. In some implementations, virtual machine 222-2 can execute on behalf of a user (e.g., user device 210), and can manage infrastructure of cloud computing environment 220, such as data management, synchronization, or long-duration data transfers.

Virtualized storage 222-3 includes one or more storage systems and/or one or more devices that use virtualization techniques within the storage systems or devices of computing resource 222. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 222-4 provides hardware virtualization techniques that allow multiple operating systems (e.g., "guest operating systems") to execute concurrently on a host computer, such as computing resource 222. Hypervisor 222-4 can present a virtual operating platform to the guest operating systems, and can manage the execution of the guest operating systems. Multiple instances of a variety of operating systems can share virtualized hardware resources.

Feature data server 225 includes one or more devices capable of receiving, processing, storing, and/or providing feature data associated with features of roadways. For example, feature data server 225 can include a server or a group of servers. In some implementations, feature data server 225 can be capable of providing (e.g., to notification platform 215) feature data associated with a route of vehicle 205, as described herein.

Network 230 includes one or more wired and/or wireless networks. For example, network 230 can include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
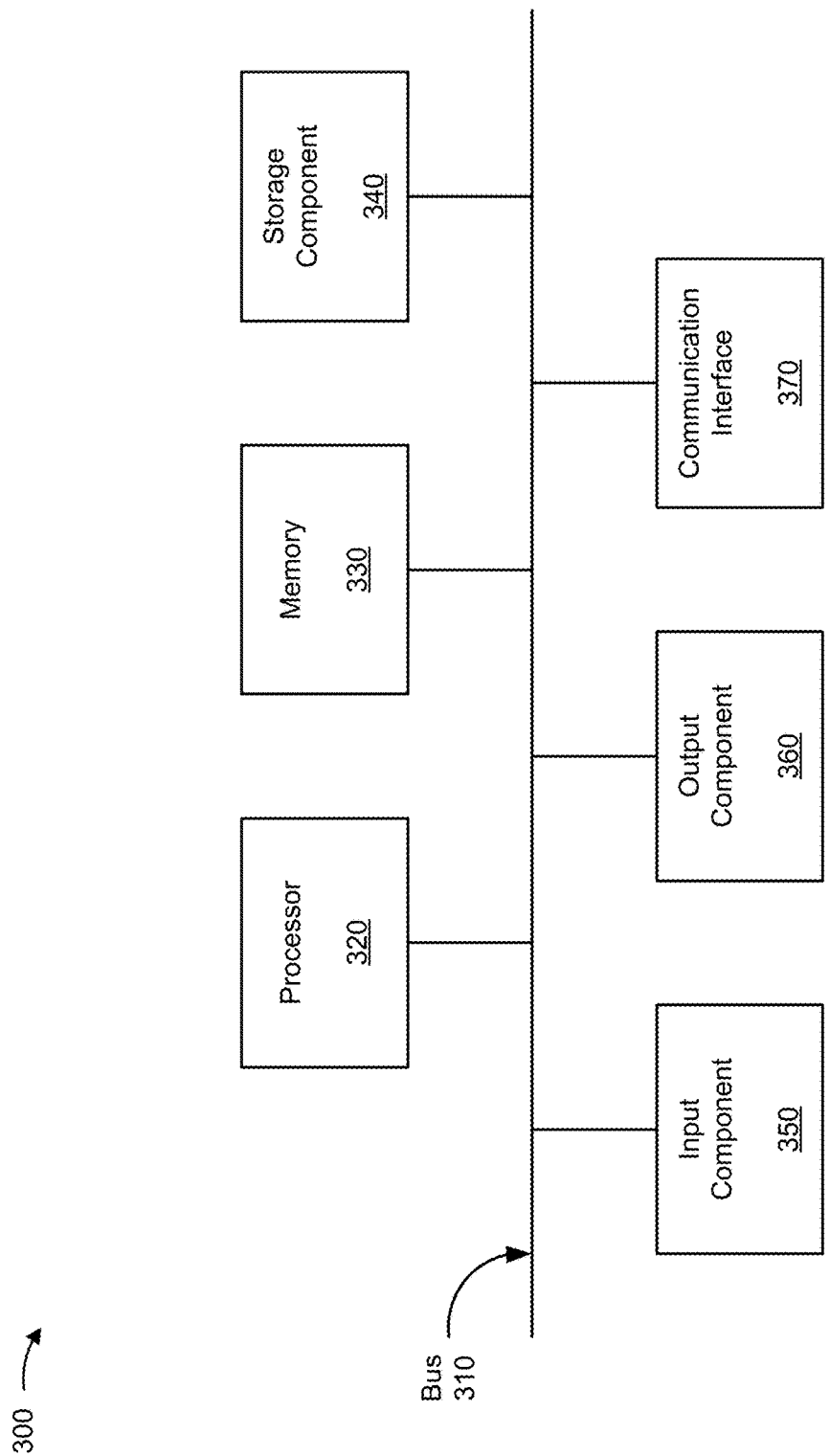
FIG. 3 is a diagram of example components of one or more devices of FIG. 2.

FIG. 3 is a diagram of example components of a device 300. Device 300 can correspond to user device 210, notification platform 215, and/or feature data server 225. In some implementations, user device 210, notification platform 215, and/or feature data server 225 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor, a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, or the like.

Device 300 can perform one or more processes described herein. Device 300 can perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
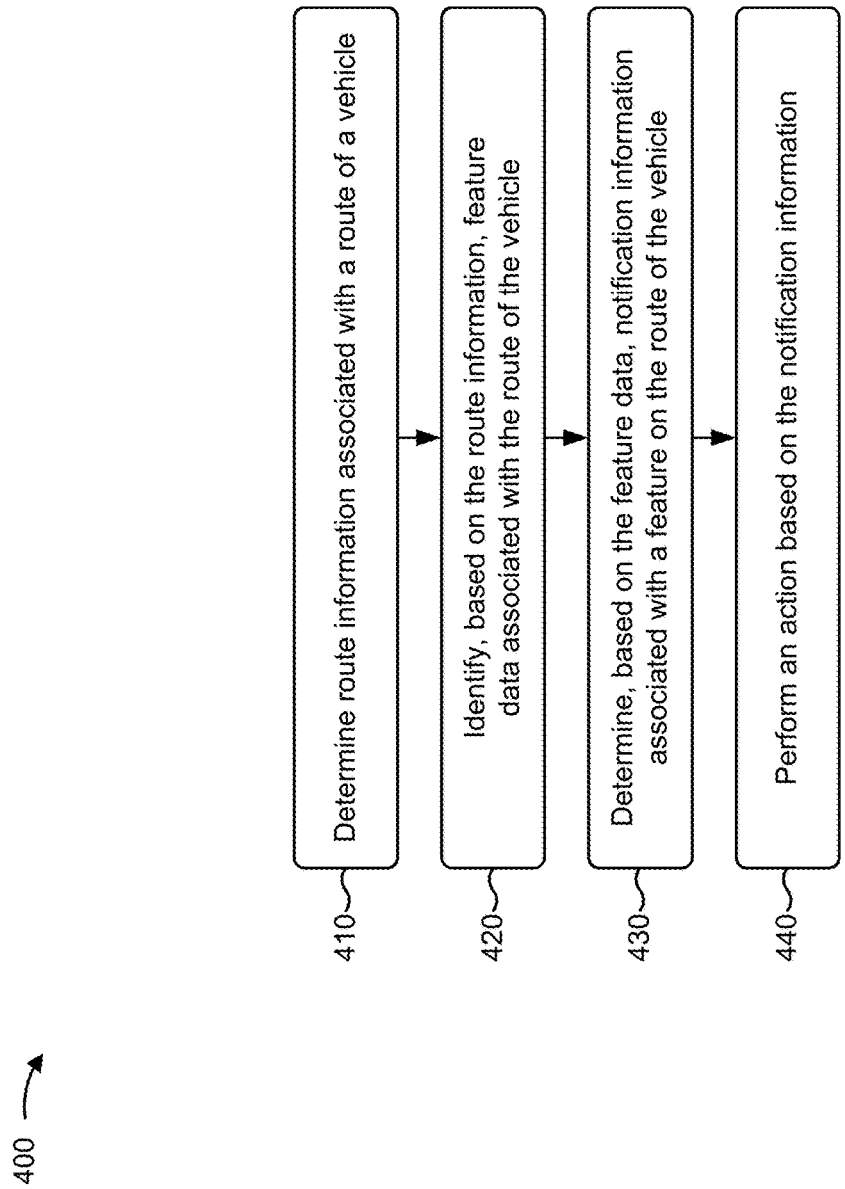
FIG. 4 is a flow chart of an example process for performing an action in connection with a feature along a route of a vehicle.

FIG. 4 is a flow chart of an example process 400 for performing an action in connection with a feature along a route of a vehicle. In some implementations, one or more process blocks of FIG. 4 can be performed by notification platform 215. In some implementations, one or more process blocks of FIG. 4 can be performed by another device or a group of devices separate from or including notification platform 215, such as user device 210 or another device within cloud computing environment 220.

As shown in FIG. 4, process 400 can include determining route information associated with a route of a vehicle (block 410). For example, notification platform 215 can determine route information associated with a route of vehicle 205.

The route information can include information associated with a route of vehicle 205. For example, the route information can include information that identifies one or more roadways on which vehicle 205 is being driven or is expected to be driven, one or more segments of the one or more roadways (e.g., information that identifies one or more portions of the one or more roadways), and/or the like.

In some implementations, notification platform 215 can determine the route information based on information associated with a planned route. The planned route can include, for example, a route from a particular starting location (e.g., a current location of user device 210 and/or vehicle 205) to a particular destination (e.g., a location identified based on user input to user device 210). In some implementations, the information associated with the planned route can be determined by a mapping service with a route planning capability. In such a case, notification platform 215 can determine the route information based on receiving the information associated with the planned route from user device 210 and/or a device associated with the mapping service with the route planning capability. For example, notification platform 215 can determine the route information based on providing a request for the information associated with the planned route, when the information associated with the planned route is automatically provided to notification platform 215, when the information associated with the planned route is provided based on user input, and/or the like. Additionally, or alternatively, notification platform 215 can determine the information associated with the planned route (e.g., when notification platform 215 is configured with a route planning capability).

Additionally, or alternatively, notification platform 215 can determine the route information based on location information associated with user device 210 and/or vehicle 205. For example, notification platform 215 can determine (e.g., based on information provided by user device 210 and/or vehicle 205) information that identifies a current location of vehicle 205 (e.g., a latitude and a longitude, a set of GPS coordinates, and/or the like) and information that identifies a direction of travel of vehicle 205 (e.g., based on directional information provided by user device 210 and/or vehicle 205, based on locations of user device 210 and/or vehicle 205 at different times, and/or the like). Here, notification platform 215 can identify (e.g., based the location information and information stored or accessible by notification platform 215) a roadway on which vehicle 205 is currently driving, and can determine the route information based on the information that identifies the roadway and information that identifies the direction of travel. In this example, the route information can include information that identifies a portion of the identified roadway in the direction of travel (e.g., when notification platform 215 is configured to assume that vehicle 205 will continue driving on the identified roadway in the identified direction). In some implementations, notification platform 215 can update (e.g., periodically, based on detecting a change in direction of travel, and/or the like) and/or revise such location-based route information.

Additionally, or alternatively, notification platform 215 can determine the route information based on information associated with a predicted route of vehicle 205. In some implementations, the information associated with the predicted route can be determined based on information associated with user device 210 and/or vehicle 205, such as a current location of user device 210 and/or vehicle 205, a current direction of travel of vehicle 205, a current time of day, a current day of the week, information associated with historical routes (e.g., a previous planned route, a previous predicted route) associated with user device 210 and/or vehicle 205, information that identifies historical locations of user device 210 and/or vehicle 205 at different times of day on different days of the week, and/or the like.

For example, notification platform 215 can have access to a route prediction model that receives, as input, information associated with the current location of user device 210 and/or vehicle 205, the current time of day, and the current day of the week. Here, the route prediction model can compare the current location, the current direction of travel, the current time of day, and the current day of the week to the information associated with the historical routes associated with user device 210 and/or vehicle 205, and can determine the information associated with the predicted route based on the comparison. As a particular example, notification platform 215 can identify a historical route for which the current location, the current direction of travel, the current time of day, and the current day of the week match (e.g., within a threshold) a corresponding information associated with the historical route, and can determine the information associated with the predicted route based on the historical route.

In some implementations, notification platform 215 can determine the information associated with the predicted route, as described in the above example. Additionally, or alternatively, notification platform 215 can determine the information associated with the predicted route based on information provided by another device, such as user device 210 and/or a device associated with a mapping service (e.g., when the other device is configured with the route prediction capability).

As further shown in FIG. 4, process 400 can include identifying, based on the route information, feature data associated with the route of the vehicle (block 420). For example, notification platform 215 can identify, based on the route information, feature data associated with the route of vehicle 205.

The feature data can include information associated with one or more features of the route that can be of interest to the user while driving vehicle 205 on the route. For example, the feature data can include information associated with a passing zone, such as information that identifies endpoints (e.g., a start location and an end location) of the passing zone, information that identifies a type of the passing zone (e.g., a dedicated passing lane, a dotted line and a solid line that allow use of an oncoming roadway lane for passing in one direction, a dotted line allowing for passing in two directions) information that identifies a length of the passing zone, and/or the like. In some implementations, such feature data can be stored by feature data server 225. In some implementations, feature data server 225 obtains the feature data based on sensor data collected by other user devices 210, sensor data collected by other vehicles 205, analysis of satellite imagery, based on geographic information system (GIS) data, and/or the like.

As another example, the feature data can include information associated with a school zone, such as information that identifies endpoints of the school zone, information that identifies a speed limit within the school zone, information that identifies a time window during which the speed limit can be enforced within the school zone, information that identifies a length of the school zone, and/or the like.

As another example, the feature data can include information associated with a segment of the route in which a speed limit is significantly higher or lower than a speed limit of another segment of the route, such as information that identifies the speed limit within the segment of the route, information that identifies a change in speed limit between the segment of the route and the other segment of the route, information that identifies a length of the segment of the route (e.g., when the speed limit changes again after the segment of the route), and/or the like.

As another example, the feature data can include information associated with a potential roadway hazard (e.g., a sharp curve, a rock slide area, a no stopping zone, a dangerous intersection, a stop light, and/or the like), such as information that identifies a type of the potential roadway hazard, information that identifies a location of the potential roadway hazard, information that identifies endpoints of the potential roadway hazard, and/or the like.

As another example, the feature data can include information associated with a segment of the route in which a number of lanes is greater than or less than a number of lanes in another segment of the route, such as information that identifies the number of lanes within the segment of the route, information that identifies a change in the number of lanes between the segment of the route and the other segment of the route, information that identifies a length of the segment of the route (e.g., when the number of lanes changes again after the segment of the route), and/or the like.

In some implementations, notification platform 215 can determine the feature data based on information provided by feature data server 225. For example, notification platform 215 can send the route information, along with a request for feature data corresponding to the route information, to feature data server 225. Here, feature data server 225 can determine the feature data, associated with the route, based on identifying one or more features that are located along the route identified by the route information, and can provide the feature data to notification platform 215, accordingly. In some implementations, notification platform 215 can request updated feature data when, for example, notification platform 215 determines updated route information (e.g., when notification platform 215 determines route information for an updated route prediction, when notification platform 215 determines that vehicle 205 changes roadways and/or directions, when notification platform 215 determines route information for an additional or different planned route, and/or the like).

As further shown in FIG. 4, process 400 can include determining, based on the feature data, notification information associated with a feature on the route of the vehicle (block 430). For example, notification platform 215 can determine, based on the feature data, notification information associated with a feature on the route of vehicle 205.

The notification information can include information associated with a notification, related to a feature along the route, that is to be provided to user device 210 (e.g., for display to a user). For example, the notification information can include information that identifies a distance to the feature, a length of the feature, an amount of time before vehicle 205 reaches the feature, an estimated amount of time that vehicle 205 can be within or pass through the feature, information that describes the feature (e.g., a type of the feature, a speed limit associated with the feature, etc.), and/or the like.

As a particular example, in the case of a passing zone, the notification information can include information that identifies a distance to a start of the passing zone, information that identifies a distance to an end of the passing zone, information that identifies a type of the passing zone, information that identifies a length of the passing zone, information that identifies an estimated amount of time during which vehicle 205 can be within the passing zone, information that identifies an estimated amount of time before vehicle 205 enters the passing zone, and/or the like.

As another example, in the case of a school zone, the notification information such as information that identifies a distance to a start of the school zone, information that identifies a distance to an end of the school zone, information that identifies a length of the school zone, information that identifies an estimated amount of time during which vehicle 205 can be within the school, information that identifies a speed limit within the school zone, information that identifies an amount by which the speed of vehicle 205 should be decreased before entering the school zone, information that identifies an estimated amount of time before vehicle 205 enters the school zone, and/or the like.

As another example, in the case of a segment of the route in which a speed limit is significantly higher or lower than a speed limit of another segment of the route, the notification information can include information that identifies a distance to a start of the segment, a distance to the end of the segment, information that identifies a length of the segment, information that identifies an estimated amount of time during which vehicle 205 can be within the segment, information that identifies a speed limit within the segment, information that identifies an amount by which a speed of vehicle 205 should be decreased or increased before entering the segment, information that identifies an estimated amount of time before vehicle 205 enters the segment, and/or the like.

As another example, in the case of a potential roadway hazard, the notification information can include information that identifies a distance to the potential roadway hazard, a distance to a start of the potential roadway hazard and an end of the potential roadway hazard (e.g., when the potential roadway hazard is associated with a segment of the route), information that identifies a length of the potential roadway hazard, information that identifies an estimated amount of time before vehicle 205 reaches the potential roadway hazard, information that identifies a type of the potential roadway hazard, and/or the like.

As another example, in the case of a segment of the route in which a number of lanes is greater than or less than a number of lanes in another segment of the route, the notification information can include information that identifies a distance to a start of the segment, a distance to the end of the segment, information that identifies a length of the segment, information that identifies an estimated amount of time during which vehicle 205 can be within the segment, information that identifies a number of lanes within the segment, information that identifies an estimated amount of time before vehicle 205 enters the segment, and/or the like.

In some implementations, notification platform 215 can determine the notification information based on the feature data, information associated with the current location of user device 210 and/or vehicle 205, and/or information associated with a current speed of user device vehicle 205.

For example, notification platform 215 can determine a type of a feature, a length of a feature (e.g., determined based in information that identifies endpoints of the feature), a speed limit associated with a feature, a number of lanes associated with a feature, and/or the like, based on the feature data.

As another example, notification platform 215 can determine information that identifies a distance to a start of a feature based on information that identifies a start location of the feature and information that identifies a current location of user device 210 and/or vehicle 205. Similarly, notification platform 215 can determine information that identifies a distance to an end of the feature based on information that identifies an end location of the feature and the information that identifies the current location of user device 210 and/or vehicle 205.

As another example, notification platform 215 can determine an estimated amount of time until vehicle 205 reaches the feature based on information that identifies a start location of the feature, the current location of the user device 210 and/or vehicle 205, and a current speed of vehicle 205. In some implementations, the estimated amount of time can take into account an anticipated increase or decrease in speed of vehicle 205 (e.g., when a speed limit associated with the feature differs from the current speed of vehicle 205).

As another example, notification platform 215 can determine an estimated amount of time that vehicle 205 will be within or pass through the feature based on information that identifies a start location of the feature, information that identifies an end location of the feature, and a current speed of vehicle 205 (e.g., when no change in a speed of vehicle 205 is anticipated in association with being within or passing through the feature) or a speed limit associated with the feature (e.g., when a change in a speed of vehicle 205 is anticipated in association with being within or passing through the feature).

As another example, notification platform 215 can determine an estimated amount of time to increase or decrease a speed of vehicle 205 based on information that identifies a current location of user device 210 and/or vehicle 205, information that identifies a start location of the feature, information that identifies a current speed of vehicle 205, and information that identifies a speed limit associated with the feature.

As another example, notification platform 215 can determine an amount by which a speed of vehicle 205 is to be increased or decreased based on information that identifies a current speed of vehicle 205 and information that identifies a speed limit associated with the feature.

Notably, the examples described above are provided merely for illustrative purposes, and other examples are possible. For example, a speed limit of a segment of the route in which vehicle 205 is currently located (e.g., determined based on a current location of vehicle 205) can be used rather than a current speed of vehicle 205 (e.g., when current speed information is not available) in order to determine one or more items of notification information. Similarly, historical speed information (e.g., information that identifies a speed of vehicle 205 when previously travelling on a segment of the route or a segment of another with a similar speed limit, information that identifies speeds of one or more other vehicles 205 when previously travelling on the segment of the route or a segment of another route with a similar speed limit, and/or the like) can be used in order to determine one or more items of notification information.

As further shown in FIG. 4, process 400 can include performing an action based on the notification information (block 440). For example, notification platform 215 can perform an action based on the notification information.

In some implementations, the action can include providing the notification information. In some implementations, notification platform 215 can provide the notification information to user device 210 (e.g., such that user device 210 can display the notification information to the user or play an audible notification via user device 210). In some implementations, notification platform 215 can provide the notification information to user device 210 such that user device 210 can display the notification information or play an audible notification before vehicle 205 reaches the feature (e.g., such that the driver can prepare to navigate the feature). Example user interfaces including notification information are shown in FIGS. 5A-5E, described below.

In some implementations, notification platform 215 can provide the notification information to user device 210 in real-time or near real-time as user device 210 travels along the route. For example, notification platform 215 can monitor a location of user device 210 and/or vehicle 205 as vehicle 205 traverses the route, and can provide the notification information to user device 210 when notification platform 215 determines that vehicle 205 is within a threshold distance (e.g., 1 mile, 2 miles, and/or the like) of an upcoming feature or within a threshold amount of time (e.g., 30 seconds, 2 minutes, and/or the like) of entering or passing the upcoming feature. In some implementations, such threshold can be default thresholds or user-configured thresholds.

In some implementations, notification platform 215 can selectively provide the notification information to user device 210. For example, in the case of an upcoming passing zone, notification platform 215 can determine a current speed of vehicle 205 on a given roadway segment, a speed limit associated with the given roadway segment, and a historical speed of vehicle 205 (e.g., on the given roadway segment, on roadways segments with speed limits similar to the given roadway segment, and/or the like). Here, if the current speed is less than the historical speed (e.g., by a threshold amount) and/or the speed limit, then notification platform 215 can provide notification information associated with the upcoming passing zone. Alternatively, if the current speed is greater than (e.g., by a threshold amount) or equal to the historical speed and/or the speed limit, then notification platform 215 does not provide notification information associated with the upcoming passing zone.

As another example, in the case of a school zone, notification platform 215 can determine a current time of day and day of the week, and a time window (e.g., a range of times of day and days of the week) during which a speed limit of the school zone can be enforced. Here, if the current time of day and day of the week fall within the time window, then notification platform 215 can provide notification information associated with the upcoming school zone. Alternatively, if the current time of day and day of the week do not fall within the time window, then notification platform 215 does not provide notification information associated with the upcoming school zone.

In some implementations, notification platform 215 can provide notification information, associated with the entire route, to user device 210 (e.g., at the beginning of the route). Here, user device 210 can store the notification information and, based on a location of user device 210, can display the notification information or play an audible notification as vehicle 205 traverses the route. In this way, user device 210 can be provided with the notification information in order to support an offline mode (e.g., whereby notification platform 215 does not communicate with user device 210 along the route), which conserves battery power of user device 210 and/or network resources. Additionally, or alternatively, notification platform 215 can provide the route information to user device 210, and user device 210 can determine the notification information. Here, notification platform 215 and/or feature data server 225 may provide the feature data to user device 210 (e.g., along with the route information, at an earlier time, and/or the like) such that user device 210 may store or cache the feature data, and user device 210 may determine the notification information based on the route information, the feature data, and information associated with a location of user device 210. In this way, user device 210 can be provided with the route information and/or the feature data in order to support the offline mode, which conserves battery power of user device 210 and/or network resources. In some implementations, notification platform 215 can provide the notification information for use in association with automatically controlling vehicle 205 (e.g., by an autonomous driving system). For example, notification platform 215 can provide the notification information for use in automatically steering vehicle 205, decreasing or increasing a speed of vehicle 205, causing vehicle 205 to pass another vehicle, causing vehicle 205 to change lanes, or otherwise autonomously driving vehicle 205.

In some implementations, the action performed by notification platform 215 can include another type of action associated with the feature corresponding to the notification information, such as causing a call to be automatically placed, a message to be automatically sent, an application to be automatically executed, and/or the like. As a particular example, in the case of a school zone (e.g., a school zone associated with a school at which the driver is to pick up a student), notification platform 215 can cause user device 210 to automatically place a call to a user device 210 of the student, automatically send a message (e.g., a text message, an email, and/or the like) to the user device 210 of the student, automatically identify a location of the student (e.g., based on location information provided by the user device 210 of the student), and/or the like. As another particular example, in the case of a potential roadway hazard, notification platform 215 can cause user device 210 and/or vehicle 205 to execute a weather application (e.g., such that the driver can be made aware of any adverse weather conditions before reaching the feature). As another particular example, notification platform 215 can cause an audio system of vehicle 205 to be turned off or muted, a play volume to be decreased, and/or the like (e.g., in order to reduce driver distraction when navigating the feature).

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

FIGS. 5A-5E are diagrams of example graphical user interfaces including notification information provided by notification platform 215 according to process 400 shown in FIG. 4.

Figure 5A:
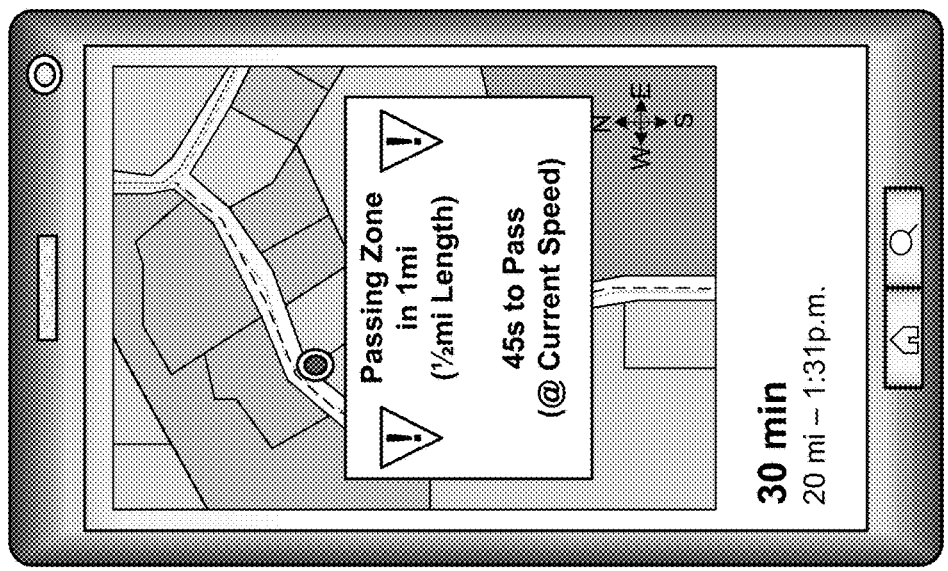
FIGS. 5A-5E are diagrams of example graphical user interfaces including notification information provided by a notification platform according to the process shown in FIG. 4.

As shown in FIG. 5A, in the case of an upcoming passing zone, user device 210 can display information that indicates a passing zone is upcoming (e.g., Passing Zone), a distance to the passing zone (e.g., 1 mi), a length of the passing zone (e.g., ½ mi Length), and an estimated amount of time during which vehicle 205 can be within or passing through the passing zone (e.g., 45 s@Current Speed).

Figure 5B:
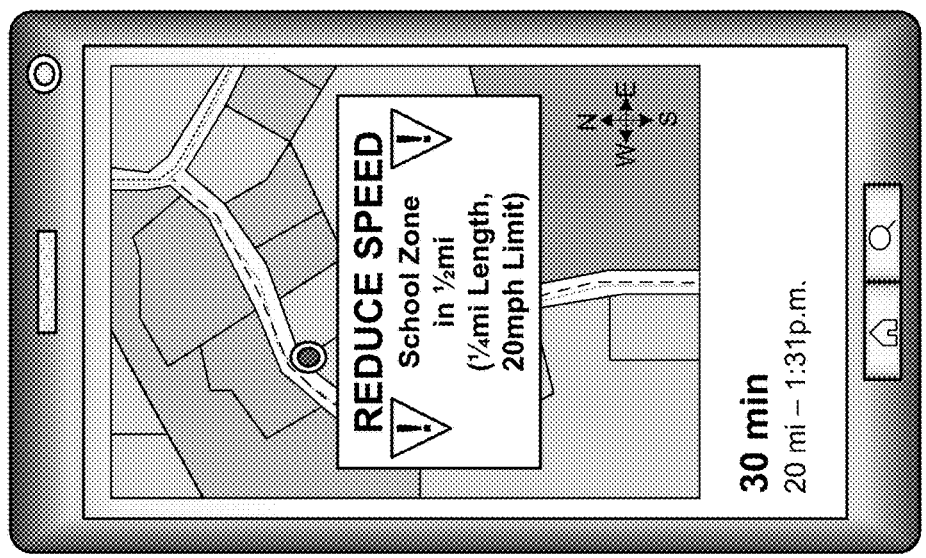

As shown in FIG. 5B, in the case of a school zone, user device 210 can display information that indicates that a school zone is upcoming (e.g., School Zone), an indication to reduce a speed of vehicle 205 (e.g., REDUCE SPEED), a distance to the school zone (e.g., ½ mi), a length of the school zone (e.g., ¼ mi length), and a speed limit within the school zone (e.g., 20 mph Limit).

Figure 5C:
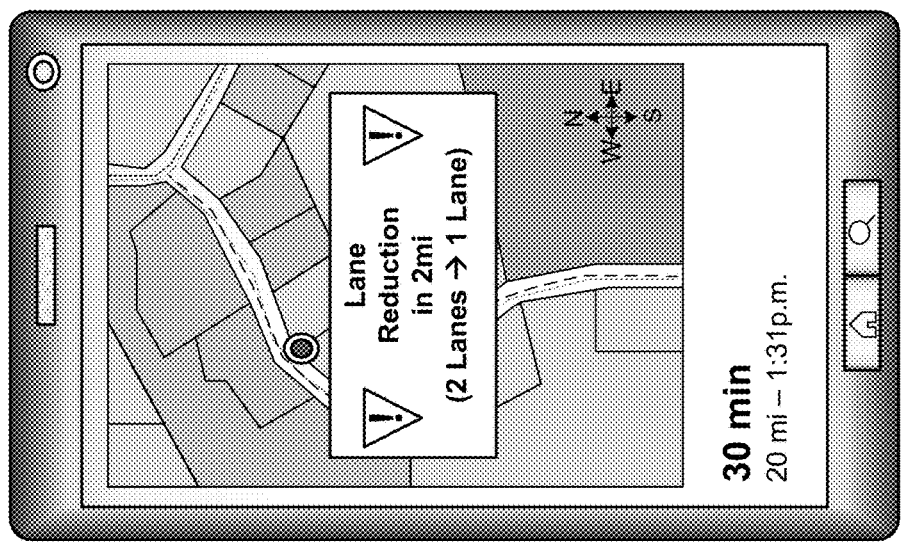

As shown in FIG. 5C, in the case of a lane reduction (e.g., when a number of lanes of the roadway is reduced), user device 210 can display information that indicates that a lane reduction is upcoming (e.g., Lane Reduction), a distance to the lane reduction (e.g., 2 mi), and information that identifies a change in the number of lanes of the roadway (e.g., 2 Lanes→1 Lane).

Figure 5D:
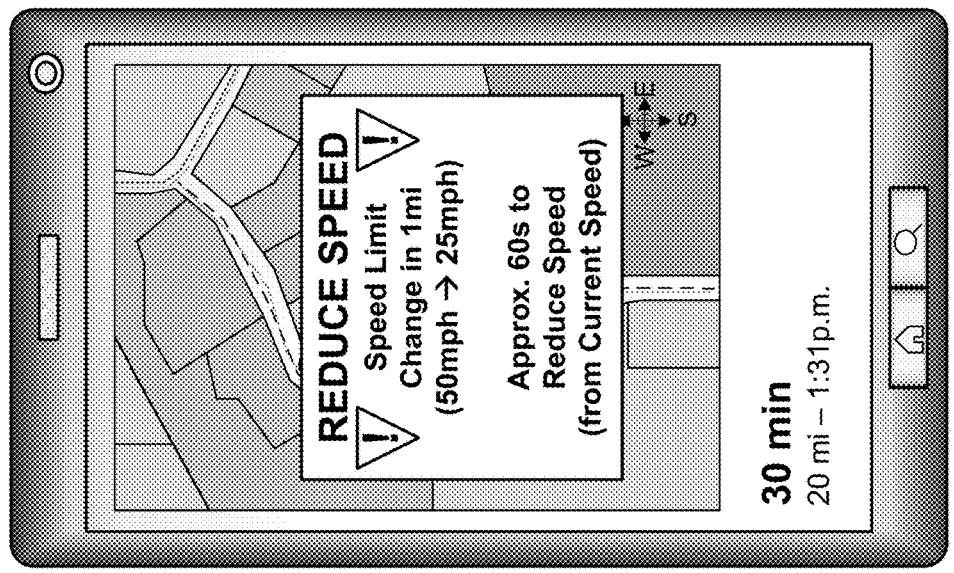

As shown in FIG. 5D, in the case of a significant speed limit reduction (e.g., when a speed limit is significantly reduced at a particular point along the route), user device 210 can display information that indicates that a speed limit change is upcoming (e.g., REDUCE SPEED, Speed Limit Change), a distance to the speed limit change (e.g., 1 mi), information that identifies a change to the speed limit (e.g., 50 mph→25 mph), and an estimated amount of time for vehicle 205 to reduce speed before entering the segment with the reduced speed limit (e.g., 60 s to Reduce Speed from Current Speed).

Figure 5E:
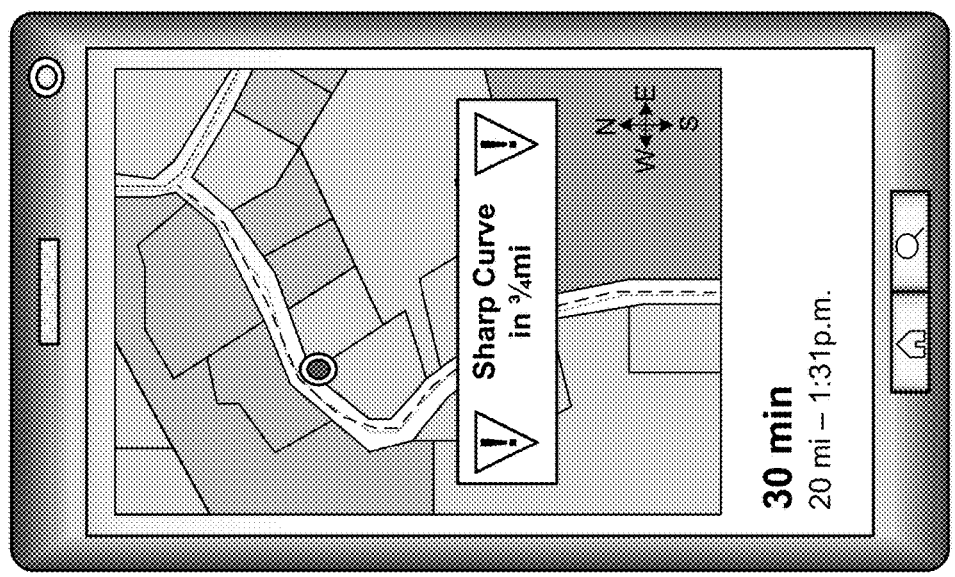

As shown in FIG. 5E, in the case of a potential roadway hazard (e.g., a sharp curve), user device 210 can display information that indicates that a potential roadway hazard is upcoming (e.g., Sharp Curve), and a distance to the potential roadway hazard (e.g., ¾ mi).

As indicated above, FIGS. 5A-5E are provided merely as an example. Other examples are possible and can differ from what was described with regard to FIGS. 5A-5E.

Some implementations described herein provide a notification platform that determines and provides notification information associated with a feature of a route on which a vehicle is or is expected to be driving. Examples of such features include a passing zone, a school zone, a roadway segment in which a speed limit is significantly higher or lower than a speed limit of a segment in which the vehicle is currently driving, a hazard area, a segment of the route in which a number of lanes is greater than or less than a number of lanes in a segment in which the vehicle is currently driving, and/or the like.

In some implementations, the notification platform can provide the notification information such that the information can be displayed to the user (e.g., a driver) in advance of the vehicle reaching the feature (e.g., such that the driver can prepare to navigate through the feature). In some implementations, the notification can include information that identifies the feature and/or a type of the feature, a length of the feature, an estimated amount of time that the vehicle can be within or pass through the feature, and/or the like, as described above.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface can include a graphical user interface, a non-graphical user interface, a text-based user interface, etc. A user interface can provide information for display. In some implementations, a user can interact with the information, such as by providing input via an input component of a device that provides the user interface for display. In some implementations, a user interface can be configurable by a device and/or a user (e.g., a user can change the size of the user interface, information provided via the user interface, a position of information provided via the user interface, etc.). Additionally, or alternatively, a user interface can be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
    determine route information associated with a route of a vehicle;
    identify, based on the route information, feature data associated with the route of the vehicle,
        the feature data identifying a feature, the feature comprising at least one of:
            a passing zone on the route of the vehicle,
            a school zone on the route of the vehicle,
            a segment of the route with a speed limit that is different from a speed limit of another segment of the route, or
            a segment of the route with a quantity of lanes that is different from another segment of the route;
    determine, based on the feature data, first notification data that identifies at least one of:
        a distance to the feature, or
        an estimated amount of time before the vehicle reaches the feature;
    determine, based on the feature data, second notification data that identifies at least one of:
        a length of the feature, or
        an estimated amount of time that the vehicle will be within or pass through the feature; and
    provide notification information associated with the feature,
        the notification information including:
            data identifying the feature,
            the first notification data, and
            the second notification data.

2. The device of claim 1, where the one or more processors are further to:
    determine information associated with a planned route from a particular starting location to a particular destination; and
    where the one or more processors, when determining the route information, are to:
        determine the route information based on the information associated with the planned route.

3. The device of claim 1, where the one or more processors are further to:
    determine a current location of the vehicle and a direction of travel of the vehicle; and
    where the one or more processors, when determining the route information, are to:
        determine the route information based on the current location of the vehicle and the direction of travel of the vehicle.

4. The device of claim 1, where the one or more processors are further to:
   determine, based on information associated with a historical route of the vehicle, information associated with a predicted route of the vehicle; and
   where the one or more processors, when determining the route information, are to:
      determine the route information based on the information associated with the predicted route.

5. The device of claim 1, where the one or more processors are further to:
   determine a current speed of the vehicle; and
   where the one or more processors, when determining the first notification data, are to:
      determine the first notification data further based on the current speed of the vehicle.

6. The device of claim 1, where the one or more processors are further to:
   determine a current location of the vehicle; and
   where the one or more processors, when determining the first notification data, are to:
      determine the first notification data further based on the current location of the vehicle.

7. A non-transitory computer-readable medium storing instructions, the instructions comprising:
   one or more instructions that, when executed by one or more processors, cause the one or more processors to:
      determine route information associated with a route of a vehicle;
      identify, based on the route information, feature data associated with the route of the vehicle,
         the feature data identifying a feature, the feature comprising at least one of:
            a passing zone on the route of the vehicle,
            a school zone on the route of the vehicle,
            a segment of the route with a speed limit that is different from a speed limit of another segment of the route, or
            a segment of the route with a quantity of lanes that is different from another segment of the route;
      determine, based on the feature data, first notification data that identifies at least one of:
         a distance to the feature, or
         an estimated amount of time before the vehicle reaches the feature;
      determine, based on the feature data, second notification data that identifies at least one of:
         a length of the feature, or
         an estimated amount of time that the vehicle will be within or pass through the feature; and
      provide notification information associated with the feature,
         the notification information including:
            data identifying the feature,
            the first notification data, and
            the second notification data.

8. The non-transitory computer-readable medium of claim 7, where the one or more instructions, when executed by the one or more processors, further cause the one or more processors to:
   determine information associated with a planned route from a particular starting location to a particular destination; and
   where the one or more instructions, that cause the one or more processors to determine the route information, cause the one or more processors to:
      determine the route information based on the information associated with the planned route.

9. The non-transitory computer-readable medium of claim 7, where the one or more instructions, when executed by the one or more processors, further cause the one or more processors to:
   determine a current location of the vehicle and a direction of travel of the vehicle; and
   where the one or more instructions, that cause the one or more processors to determine the route information, cause the one or more processors to:
      determine the route information based on the current location of the vehicle and the direction of travel of the vehicle.

10. The non-transitory computer-readable medium of claim 7, where the one or more instructions, when executed by the one or more processors, further cause the one or more processors to:
    determine, based on information associated with a historical route of the vehicle, information associated with a predicted route of the vehicle; and
    where the one or more instructions, that cause the one or more processors to determine the route information, cause the one or more processors to:
       determine the route information based on the information associated with the predicted route.

11. The non-transitory computer-readable medium of claim 7, where the one or more instructions, when executed by the one or more processors, further cause the one or more processors to:
    determine a speed of the vehicle or a location of the vehicle; and
    where the one or more instructions, that cause the one or more processors to determine the first notification data, cause the one or more processors to:
       determine the first notification data further based on the speed of the vehicle or the location of the vehicle.

12. The non-transitory computer-readable medium of claim 7, where the one or more instructions, when executed by the one or more processors, further cause the one or more processors to:
    determine that a current speed of the vehicle satisfies a threshold; and
    where the one or more instructions, that cause the one or more processors to provide the notification information, cause the one or more processors to:
       provide the notification information based on determining that the current speed of the vehicle satisfies the threshold.

13. A method, comprising:
    determining, by a device, route information associated with a route of a vehicle;
    identifying, by the device and based on the route information, feature data associated with the route of the vehicle,
       the feature data identifying a feature, the feature comprising at least one of:
          a passing zone on the route of the vehicle,
          a school zone on the route of the vehicle,
          a segment of the route with a speed limit that is different from a speed limit of another segment of the route, or
          a segment of the route with a quantity of lanes that is different from another segment of the route;

determining, by the device and based on the feature data, first notification data that identifies at least one of:
   a distance to the feature, or
   an estimated amount of time before the vehicle reaches the feature;
determining, by the device and based on the feature data, second notification data that identifies at least one of:
   a length of the feature, or
   an estimated amount of time that the vehicle will be within or pass through the feature; and
providing, by the device, notification information,
   the notification information including:
      data identifying the feature,
      the first notification data, and
      the second notification data.

14. The method of claim 13, further comprising:
determining information associated with a planned route from a particular starting location to a particular destination; and
where determining the route information comprises:
   determining the route information based on the information associated with the planned route.

15. The method of claim 13, further comprising:
determining a current location of the vehicle and a direction of travel of the vehicle; and
where determining the route information comprises:
   determining the route information based on the current location of the vehicle and the direction of travel of the vehicle.

16. The method of claim 13, further comprising:
determining a speed of the vehicle or a location of the vehicle; and
where determining the first notification data:
   determining the first notification data further based on the speed of the vehicle or the location of the vehicle.

17. The method of claim 13, further comprising:
determining a speed of the vehicle or a location of the vehicle; and
where determining the second notification data:
   determining the second notification data further based on the speed of the vehicle or the location of the vehicle.

18. The device of claim 1, where the one or more processors are further to:
determine a current speed of the vehicle; and
where the one or more processors, when determining the second notification data, are to:
   determine the second notification data further based on the current speed of the vehicle.

19. The device of claim 1, wherein the one or more processors, when determining the second notification data, are further to:
determine the length of the feature based on two endpoints associated with the feature, or
determine the estimated amount of time that the vehicle will be within or pass through the feature based on the two endpoints associated with the feature.

20. The non-transitory computer-readable medium of claim 7, where the one or more instructions, when executed by the one or more processors, further cause the one or more processors to:
determine a speed of the vehicle or a location of the vehicle; and
where the one or more instructions, that cause the one or more processors to determine the second notification data, cause the one or more processors to:
   determine the second notification data further based on the speed of the vehicle or the location of the vehicle.

\* \* \* \* \*